March 7, 1944.                J. C. BAILIE ET AL                2,343,295
                    PETROLEUM OIL CONVERSION WITH CATALYSTS
                            Filed April 26, 1941
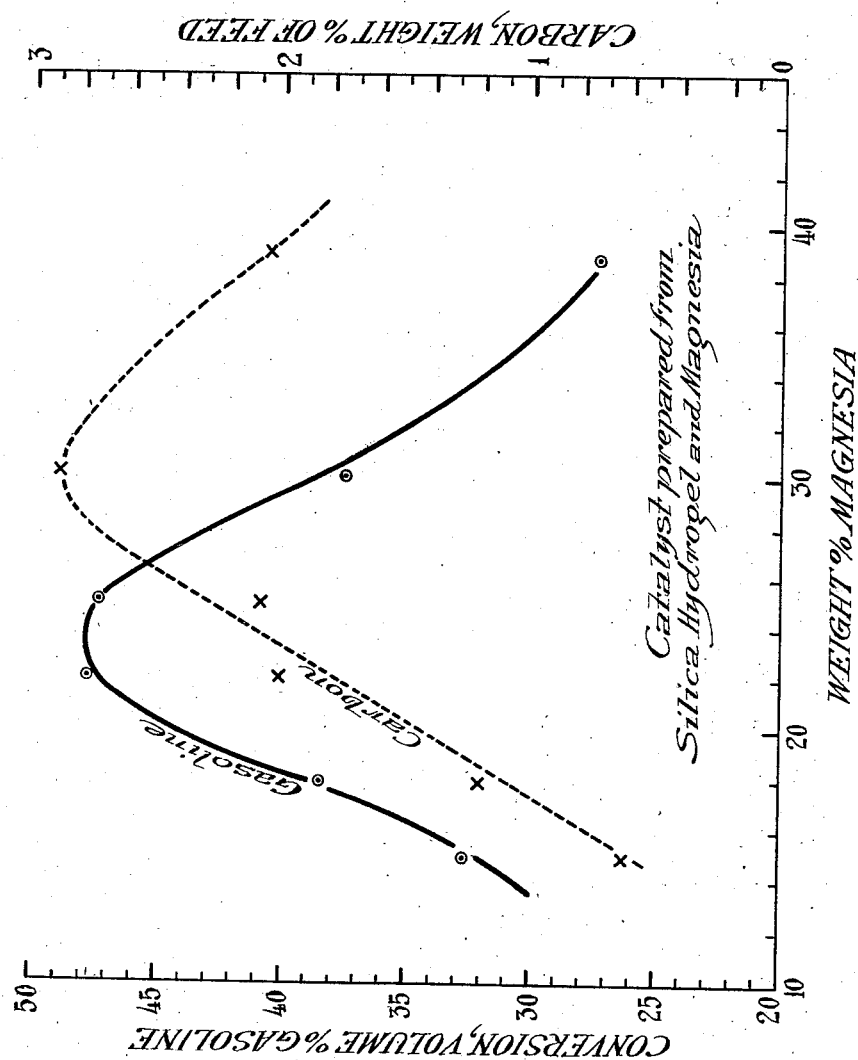

Patented Mar. 7, 1944

2,343,295

UNITED STATES PATENT OFFICE 2,343,295

PETROLEUM OIL CONVERSION WITH CATALYSTS

James C. Bailie and Melvin J. See, Chicago, Ill., assignors to Standard Oil Company, Chicago, Ill., a corporation of Indiana Application April 26, 1941, Serial No. 390,612

7 Claims. (Cl. 196—52)

This invention relates to the cracking of petroleum oils and the reforming of gasoline and heavy naphtha for the manufacture of motor fuels of high knock rating. More specifically, the invention relates to the catalytic conversion of petroleum hydrocarbons into motor fuels of high knock rating and especially to the cracking of gas oils in the presence of a solid catalyst. The process is characterized by the use of a catalyst made by the combination of certain metal oxides, specifically the oxides of the polyvalent metals of Series 3 of the Periodic System (Mendelejeff). This application is a continuation in part of United States Serial No. 317,404 filed February 5, 1940.

One object of the invention is to effect the conversion of hydrocarbon oils by the action of catalysts in a manner to produce a maximum yield of gasoline with a high knock rating. Another object of the invention is to effect the conversion of oils with a minimum production of fixed carbon accumulated on the catalyst and a minimum production of fixed gases. Another object of the invention is to provide a catalyst, for the conversion of oils, which has a longer life than most of the catalysts heretofore used and which may be repeatedly regenerated, substantially without loss in activity, by combustion with oxidizing gases at higher temperatures than permissible with many of the catalysts heretofore employed. Still another object of the invention is to provide a method of manufacturing hydrocarbon conversion catalysts of high activity from mixtures of the oxides of magnesium and silicon by intimately combining them in a fine state of subdivision substantially without the use of expensive chemical reagents and substantially without the need of washing to remove undesirable chemical by-products.

The accompanying drawing which forms a part of this specification graphically illustrates the results obtained in the conversion of heavy oil to gasoline in accordance with the process of our invention.

In the manufacture of our catalyst, we may use various forms of magnesia and silica. We may also add alumina in a minor amount, as a promoter. As sources for our magnesia, silica and alumina, we may use bauxite, precipitated alumina, alumina gel, kieselguhr, quartz, silica gel, silica hydrogel, calcined magnesite, brucite, hydrated magnesium oxide and precipitated magnesia. In general, we prefer to use the chemically reactive forms of the oxides rather than the massive oxides. We have also found that the temperature of calcination of magnesite affects the catalytic activity of the resulting catalyst. Thus, magnesite calcined at 1400° F. has been found to give a more active catalyst than the magnesite as ordinarily calcined at about 2000° F.

In the preparation of our catalyst, we may mix or grind together the oxide ingredients in a mill, for example, a ball mill, in order to effect intimate contact between the different oxides in the catalyst mixture. Mixing or milling may be done wet or dry but if the mixing is done dry, it is desirable later to wet the mixture with water in order to bring about what appears to be a surface reaction between the oxide particles. In the case where the silica is employed in the form of silica hydrogel or silica sol, it may be either ground with the magnesia or thoroughly mixed in case the magnesia is already in a finely divided condition.

After mixing, the catalyst is formed into pellets, preferably in the wet or dampened condition. It is not necessary to employ pressure in the pelleting operation but pressure may be used if desired. For example, the catalyst mixture may be pelleted on a pilling machine with high pressure or it may be extruded through a die under high pressure if desired and then finally dried. Final drying may be done at ordinary temperature but preferably at somewhat elevated temperature, for example, 240 F. for 24 hours followed by heating to 1000° F. for 8 hours.

The following examples will show the results obtained with a magnesia-silica catalyst in which the magnesia was prepared from magnesite calcined at three different temperatures, 1000° F., 1400° F. and about 2000° F. In making this catalyst a 50% mixture of the calcined magnesite and commercial silica gel was ground in a ball mill, wetted and formed into pellets and dried as described hereinabove. The resulting catalyst was used for the cracking of Mid-Continent gas oil.

|  | Catalyst—SiO$_2$+ | | | | | |
|---|---|---|---|---|---|---|
|  | Magnesite calcined at 1000° F. | | Magnesite calcined at 1400° F. | | | Magnesite calcined at 2000° F. |
| Temperature_____°F__ | 925 | 925 | 925 | 850 | 925 | 925 |
| Space velocity_____ | 0.97 | 1.02 | 0.99 | 1.01 | 1.0 | 0.97 |
| Duration of run_hours__ | 5.0 | 1.0 | 5.0 | 1.0 | 1.0 | 5.0 |
| Gasoline volume percent__ | 31.3 | 41.0 | 33.1 | 31.0 | 40.5 | 25.2 |
| Gas____weight percent__ | 3.9 | 4.7 | 5.8 | 3.8 | 9.0 | 5.2 |
| Carbon_____do____ | 0.44 | 0.88 | 0.60 | 0.57 | 0.81 | 0.41 |
| Knock rating CFR-M_ | 76.2 | ____ | 80.6 | 79.1 | ____ | 79.1 |
| Reid vapor pressure____ | 12.0 | 16.0 | 11.9 | 11.7 | 12.1 | 12.3 |

The space velocity referred to is the volume of oil charged per gross volume of catalyst per hour.

The following data show the beneficial effect of water in the preparation of the catalyst. In making this catalyst a mixture of 50% magnesia and 50% silica was employed. The magnesia was obtained by calcining magnesite at 1400° F. The silica was a commercial silica gel. The ingredients were ground together in a ball mill in the dry form. In the one case the mixture was pelleted dry without a preliminary wetting step, and in the other case the mixture was wetted, dried and then pelleted. Both catalysts were then heated to 1000° F. for 8 hours before use.

| Catalyst | Pelleted dry | Wetted and dried pelleted |
| --- | --- | --- |
| Stock treated | Mid-Continent gas oil. | Mid-Continent gas oil. |
| Catalyst density | 0.84 | 0.78. |
| Gasoline produced | 19.0% | 30.0%. |
| Gas | 4.5% by weight | 4.6% by weight. |
| Carbon | 0.95% by weight | 0.94% by weight. |

The higher activity of the wetted catalyst is apparent from the increase in gasoline yield.

As another example of the use of our catalyst in cracking, a catalyst was prepared containing 33⅓% each of silica gel, magnesia and alumina. The ingredients were milled in a ball mill for 8 hours and pelleted wet without pressure. About 30 minutes was required to air dry the pellets. The catalyst was further dried at 240° F. for 24 hours and finally at 1000° F. for 8 hours. The following data were obtained with this catalyst in a cracking test:

| Stock charged | Mid-Continent gas oil |
| --- | --- |
| Space velocity | 1.0 |
| Duration of test hours | 5 |
| Temperature ° F | 925° |
| Density of catalyst | 0.52 |
| Gasoline produced per cent | 29.3 |
| Gas per cent by weight | 3.8 |
| Carbon do | 0.52 |
| Reid vapor pressure | 11.3 |
| Knock rating CFR-M | 79.5 |

When used in the reforming of gasoline to increase the knock rating, our new catalyst will produce high yields of gasoline of about 75 to 85 knock rating, CFR-M when employing a virgin heavy naphtha charging stock having a knock rating of about 30 to 40 CFR-M. In reforming, we prefer to use hydrogen to reduce carbonization of the catalyst and we may use about 1 to 5 mols of hydrogen per mol of naphtha treated at a pressure of about 50 to 400 pounds per square inch and a space velocity of about 0.1 to 2. The temperature employed in reforming will usually be higher than that employed in the cracking of gas oil. For example, in reforming operations, we may employ temperatures of about 900 to 1025° F. whereas in cracking, temperatures of about 850° to 950° F. are satisfactory.

Although we prefer to prepare our catalyst by mixing the ingredients while grinding to reduce the particle size, we may separately grind the ingredients and mechanically mix them, preferably with water, taking care to obtain a uniform, homogeneous mixture, a paste or a dough, which may then be formed into any desired shape. The proportions of the ingredients used may be equimolecular. However, in the case where a promoter oxide is employed, it may be added in relatively smaller proportions, for example, 1/100 to ½ mol per mol of magnesia. A catalyst containing about 15 to 30% of magnesia may contain about 1 to 10% of alumina. Other activating elements may be added to our catalyst in small amounts, for example, ½ to 10% of the oxides of the fifth and sixth group metals, including vanadium, chromium and molybdenum.

We have also found thorium oxide advantageous, particularly as a stabilizer for the regeneration of the magnesia catalyst. About ½ to 10%, for example 5%, of thoria increases the life of the catalyst after numerous regenerations.

In the case of silica-magnesia catalysts prepared by mixing magnesia with silica hydrogel, we have found that the most effective catalyst is obtained with about 22% magnesium oxide in the composition. Furthermore, as the amount of magnesia is increased or decreased, the activity falls off rapidly through a range of magnesia concentrations between about 14% on the low side to about 35% on the high side. The preferred composition lies within the range of about 18 to 25% of magnesia in combination with silica. The percentages given here are based on the combined weight of the silica and magnesia present. The following table gives typical results obtained with five catalysts made by thoroughly mixing silica hydrogel with magnesia prepared from carefully calcined magnesite:

Cracking Mid-Continent gas oil (35° A. P. L.)

Temperature—925° F.
Reaction period—2 hours
Space velocity—1 vol. per vol. per hr.

| Magnesia content per cent | 15 | 18 | 22 | 25 | 30.3 |
| --- | --- | --- | --- | --- | --- |
| Gasoline—10 lbs. Reid vapor pressure do | 32.7 | 38.8 | 47.8 | 47.3 | 37.6 |
| Excess butanes do | 3.1 | 4.4 | 4.3 | 5.0 | 4.6 |
| Dry gas do | 6.0 | 7.4 | 7.8 | 9.8 | 8.5 |
| Carbon do | 0.6 | 1.2 | 2.0 | 2.1 | 2.9 |
| Knock rating—A. S. T. M | 79.3 | 80.1 | 79.7 | 80.3 | 79.8 |

As an illustration of the results obtained in the cracking of Mid-Continent gas oil (35°) with magnesia-silica catalysts prepared from silica hydrogel and calcined magnesite, the accompanying drawing shows the gasoline yield and the carbon formation for various catalysts from about 10% to about 40% magnesium oxide. It will be observed that the carbon formation is somewhat greater with catalysts of higher magnesia content and for this reason we prefer to use magnesia-silica catalysts in which the magnesia concentration is slightly below the optimum for gasoline production. Catalysts having about 20% of magnesia are very satisfactory for this reason.

When employing our catalyst in the form of aggregates, such as pellets, we may charge the catalyst to a container or cracking chamber and pass the hydrocarbon vapors therethrough at the desired temperature. Means may be provided for maintaining the temperature during the reaction, and if operating for a period of time, for example, 10 minutes to 5 hours, the operation may be suspended and the catalyst regenerated by burning with an oxidizing gas such as air or air diluted with inert gases. The regenerated catalyst may then be used over again and it has been found that our catalyst will maintain its activity after repeated regeneration. Instead of employing the catalyst in masses, we may, after wet mixing and drying, reduce the catalyst again to the form of a powder by further grinding and crushing and contacting it with hydrocarbon vapors in the form of a suspension. The powder may be added to the oil to be treated either dry or as a water slurry and then the mixture passed through a pipe heater wherein it is heated to the desired cracking temperature; or the catalyst, either dry or in the form of a water or oil slurry, may be introduced directly into the superheated hydrocarbon vapors, for example, gas oil vapors passing from a pipe furnace to a cracking chamber. When using the catalyst in powdered form, it may be separated from the hydrocarbon products by suitable cyclone separators, filters, settling devices, electrostatic precipitators, etc. The recovered catalyst is then burned with an oxidizing gas such as air diluted with inert flue gases and used again in the conversion process.

Having thus described our invention, what we claim is:

1. The process of converting hydrocarbon oils wherein said oils are contacted at conversion temperatures with a catalyst consisting essentially of active magnesia and active silica containing more than 15% and less than 30% of magnesia prepared by intimately mixing finely divided magnesia with silica hydrogel and thereafter drying and igniting the resulting mixture.

2. The process of converting hydrocarbon oils comprising contacting said oils at conversion temperatures with a solid conversion catalyst prepared from a mixture of silica gel and calcined magnesite, said catalyst containing more than 15% and less than 30% of magnesia said magnesite being mixed with said silica gel in a wetted condition and thereafter dried and ignited.

3. The process of converting hydrocarbon oils comprising contacting said oils at conversion temperatures with a solid conversion catalyst prepared from a mixture of silica gel and calcined magnesite, said catalyst containing about 18 to 25% of magnesia, said magnesite being mixed with said silica gel in a wetted condition and thereafter dried and ignited.

4. The process of converting hydrocarbon oils comprising contacting said oils at conversion temperatures with a solid conversion catalyst prepared from a mixture of silica gel and calcined magnesite, said catalyst containing about 20% of magnesia, said magnesite being mixed with said silica gel in a wetted condition and thereafter dried and ignited.

5. The process of converting hydrocarbon oils wherein said oils are contacted at conversion temperatures with a catalyst consisting essentially of active magnesia and active silica containing about 20% of magnesia prepared by intimately mixing finely divided magnesia with silica hydrogel and thereafter drying and igniting the resulting mixture.

6. The process of converting hydrocarbon oils wherein said oils are contacted at conversion temperatures with a catalyst consisting essentially of active silica and active magnesia obtained from calcining magnesite at a controlled temperature of about 1400° F., said catalyst containing more than 15% and less than 30% of magnesia and having been prepared by intimately mixing said magnesia in finely divided form with silica hydrogel and thereafter drying and igniting the resulting mixture.

7. The process of claim 1 wherein the magnesia is obtained from calcining magnesite at a controlled temperature between about 1000 and 2000° F.

JAMES C. BAILIE.
MELVIN J. SEE.